(12) United States Patent
Fuks et al.

(10) Patent No.: US 8,635,414 B2
(45) Date of Patent: Jan. 21, 2014

(54) SYSTEM AND METHOD FOR ALLOCATING MEMORY RESOURCES

(75) Inventors: Adam Fuks, Mountain View, CA (US); Jurgen Holger Titus Geerlings, Valkenswaard (NL)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 13/168,741

(22) Filed: Jun. 24, 2011

(65) Prior Publication Data

US 2012/0331255 A1 Dec. 27, 2012

(51) Int. Cl.
*G06F 12/00* (2006.01)

(52) U.S. Cl.
USPC ........... 711/152; 711/150; 711/151; 711/163; 711/167; 711/168; 711/169

(58) Field of Classification Search
USPC .................. 711/150, 151–152, 163, 167–169
See application file for complete search history.

(56) References Cited

U.S. PATENT DOCUMENTS

2008/0320603 A1\* 12/2008 Ito .................................. 726/28

\* cited by examiner

*Primary Examiner* — Jasmine Song

(57) ABSTRACT

System and method for allocating memory resources are disclosed. The system utilizes a bus system coupled to a plurality of requestors and a plurality of memory systems coupled to the bus system. Each memory system includes a memory component and a memory management module including a value that represents access rights to the memory component. The memory management module is configured to receive an access request from a first requestor of the plurality of requestors and to grant access to the memory component only if the value indicates that the first requestor has access rights to the memory component. The memory management module is configurable to change the value to give the access rights to the memory component to a second requestor of the plurality of requestors.

20 Claims, 8 Drawing Sheets

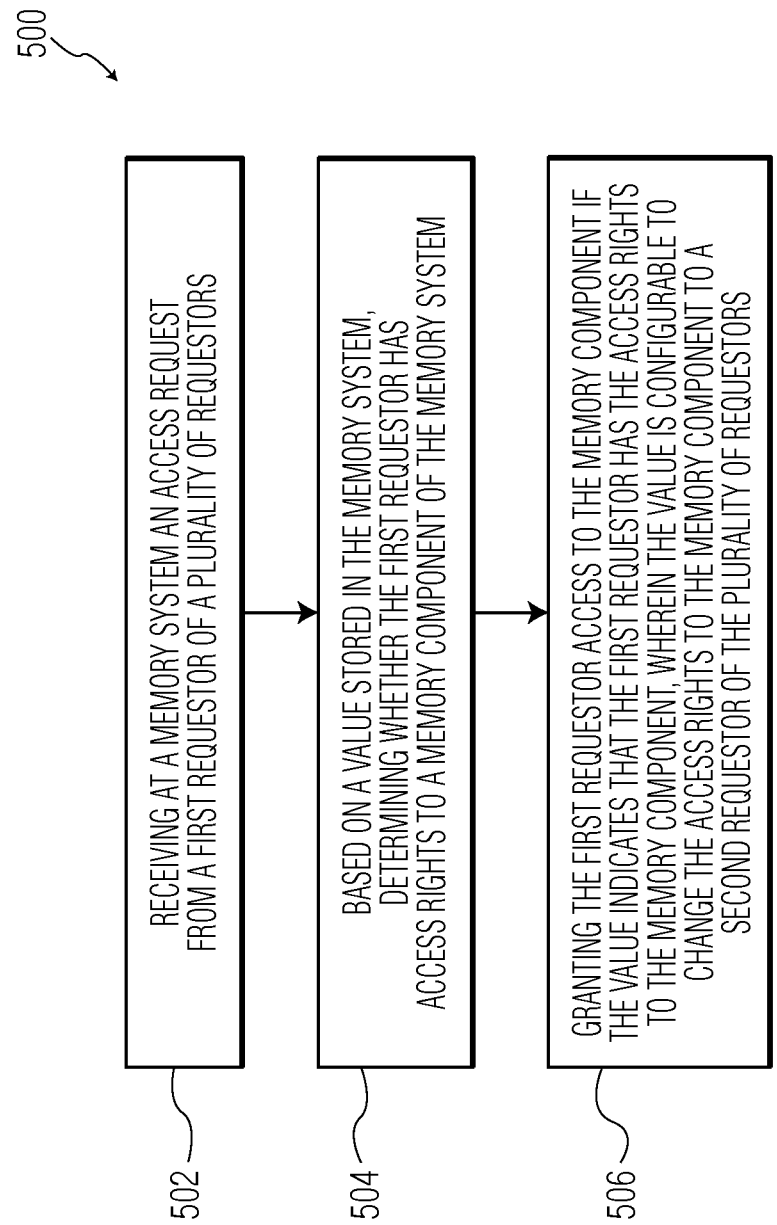

SYSTEM AND METHOD FOR ALLOCATING MEMORY RESOURCES

In a computing system, such as a system on chip (SoC) integrated circuit, a multitude of bus masters are typically present, each potentially running at a different clock speed. Partitioning of memory resources is done during the design phase of the integrated circuit to assign the memory resources to masters and therefore to a specific clock. For a master to interface with a memory resource that is running at a clock that is non-native to the master, a bridge is usually required. This, however, introduces unwanted latencies in accessing the memory resources. In a typical system including a multitude of masters, it is not possible to allocate the memory resources dynamically.

A system for allocating memory resources in accordance with an embodiment of the invention is disclosed. The system includes a bus system coupled to a plurality of requestors, and a plurality of memory systems coupled to the bus system. Each memory system includes a memory component and a memory management module including a value that represents access rights to the memory component. The memory management module is configured to receive an access request from a first requestor of the plurality of requestors and to grant access to the memory component only if the value indicates that the first requestor has access rights to the memory component. The memory management module is configurable to change the value to give the access rights to the memory component to a second requestor of the plurality of requestors. In one embodiment, the system further includes a readout circuitry coupled to the memory systems and the bus system, the readout circuitry being configured to selectively transmit data from the memory systems to the bus system based on access requests to the memory components.

A method for allocating memory resources in accordance with an embodiment of the invention is disclosed. The method includes receiving at a memory system an access request from a first requestor of a plurality of requestors, and based on a value stored in the memory system, determining whether the first requestor has access rights to a memory component of the memory system. The method further includes granting the first requestor access to the memory component if the value indicates that the first requestor has the access rights to the memory component, whereby the value is configurable to change the access rights to the memory component to a second requestor of the plurality of requestors.

FIG. 5 depicts a flow diagram of a method for allocating memory resources in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
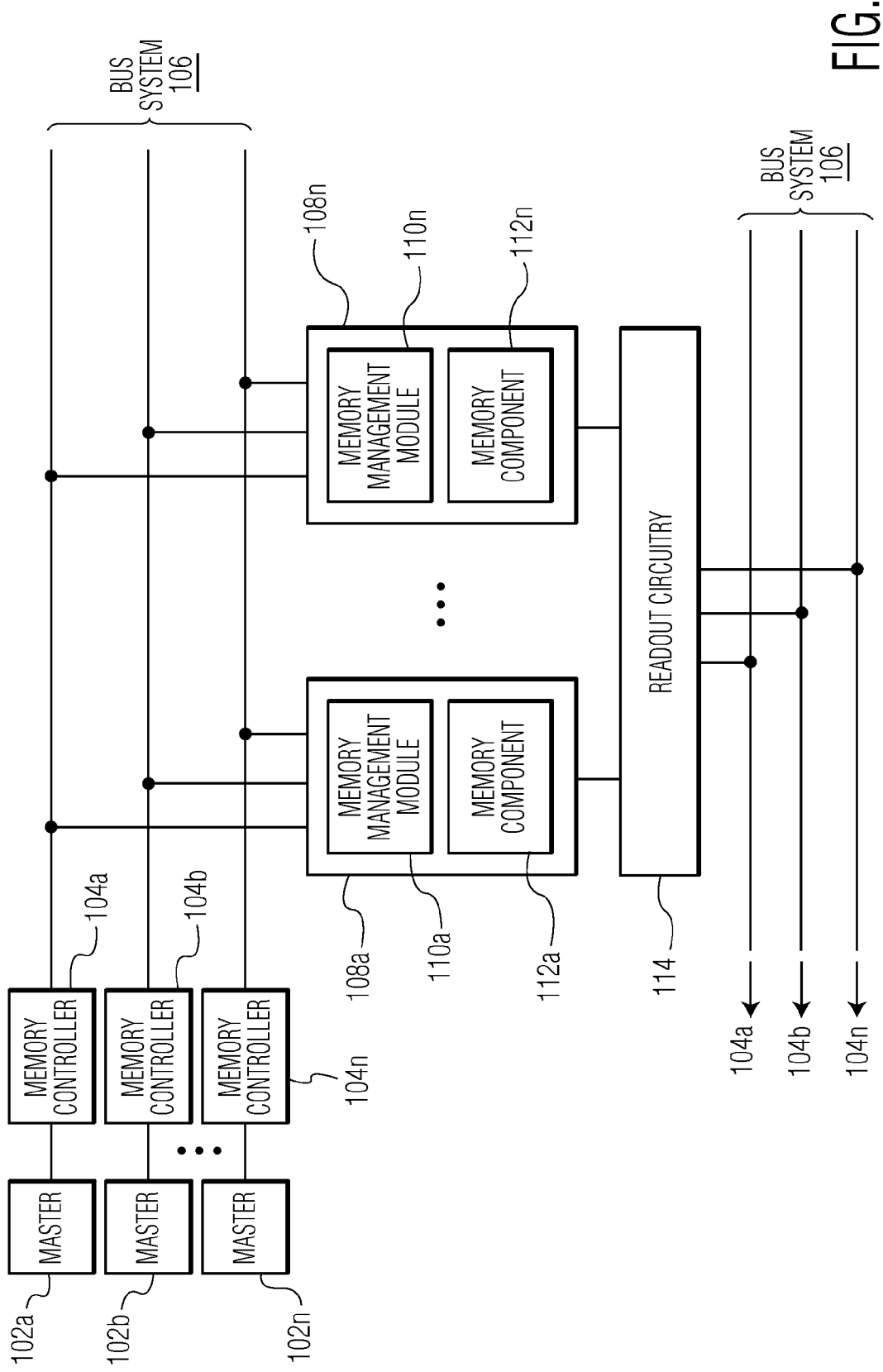
FIG. 1 depicts a system for allocating memory resources in accordance with an embodiment of the invention.

FIG. 1 depicts a system for allocating memory resources in accordance with an embodiment of the invention. The system is configured to allow interfacing of masters 102a-102n to memory systems 108a-108n. The memory systems are, for example, implemented in a system on chip (SoC) integrated circuit including one or more processor cores, a microcontroller, or a general purpose computer. In the embodiment of FIG. 1, each of the memory systems includes a memory management module 110 and a memory component 112. The memory component can be considered a memory resource and is at least a part of a memory such as, in a non-limiting example, a random access memory (RAM), a register, a flash memory, a read only memory or any other type of volatile or non-volatile memory. In one embodiment, the memory component represents the entire memory. In another embodiment, the memory component is a sub-region of the memory component, such as a block of the memory. Each memory component is mapped to a specific address space by the corresponding memory management module and the address space of the memory component is configurable. The memory systems are further connected to a readout circuitry 114, which can be implemented in, for example, an integrated circuit. The readout circuitry is responsible for sending data from the memory components to the appropriate memory controller. In one embodiment, the data is sent to the memory controllers over a bus system 106, which is described below.

The masters 102a-102n are connected to the memory systems 108a-108n via memory controllers 104a-104n. The masters are, in a non-limiting example, multiple processor cores running at different clock domains. In one embodiment, at least one of the masters is implemented on the same SoC as at least one memory system. Each memory controller is connected to one or more masters and is clocked on the specific clock domain of the masters. The memory controllers are further coupled to the memory systems over a bus system 106, which typically includes an address bus and a data bus (not shown in FIG. 1). The address bus is used to specify the physical address of a memory location (memory address) to which read and/or write access is to be made and the data bus carries the data to be written to or read from the memory. Address and data buses are well known in the field. The memory controllers also typically send their clock signals over the bus system. The bus system includes, in a non-limiting example, one or more on-chip connections of a microcontroller, one or more Peripheral Component Interconnect (PCI) buses, one or more front side buses, one or more memory buses, or one or more electrical connections between components of a computing system or an SoC, or any combination thereof.

Each memory controller 104a-104n is assigned to a specific memory address space, each address space typically representing an individual address space that does not overlap with any other address space, although at least partial overlap may occur in some embodiments. In a non-limiting example, the memory controller 104a is assigned to a first controller address space, the memory controller 104b is assigned to a second controller address space and the memory controller 104n is assigned to an n-th controller address space, where n is any number greater than one. Each address space defines a specific range of addresses that a memory controller can write to or read from.

In operation, each master 102a-102n can request access (read or write) to a specific memory address, whereby the memory address is within the controller address space of the memory controller to which the master is connected. Thus, each master or memory controller can be viewed as a requestor. The access requests include memory addresses that represent the memory locations for the read/write accesses. The access requests are transferred over the bus system 106 via the corresponding memory controllers 104a-104n to the memory systems 108a-108n. Each memory management module 110a-110n receives the access requests and determines whether the access requests should be accepted. In one embodiment, the memory addresses given by the access requests refer to a memory address that has a value within a range given by the address space assigned to the corresponding memory components 112a-112n. The memory management module grants access to the memory component only if the memory address falls within the address space assigned to the memory component. In one embodiment, the memory management module has knowledge of the address space assigned to the memory controller that sent the access request, and the memory management module compares the start address and end address of the memory controller's address space with the start address and end address of the address space assigned to the memory component in order to determine whether or not the memory controller has ownership over the memory component. In another embodiment, the memory management module assigns the memory component to a particular memory controller and only access requests from the memory controller that the memory component is assigned to are accepted.

The address space assigned to each memory component is programmable and can be configured to assign a different address space to the memory component, thereby allowing the memory component to be assigned to a different memory controller. When the memory component is assigned from a current memory controller to a new memory controller, the current clock signals to the memory component are shut off and the clock signals of the new memory controller are passed to the memory component.

Thus, by assigning a memory component to a new memory controller, the memory component can be accessed by the new memory controller without the need to translate the access request from one clock domain to another clock domain. As a result, latency of memory accesses is decreased. Additionally, the memory components can be assigned to different memory controllers on an as needed basis, greatly increasing flexibility of the system. Furthermore, more than one memory component can be assigned to a single memory controller, which allows partitioning of memory resources in terms size. Each memory component (and the data contained in the memory component if applicable) can be dynamically mapped to different memory controllers, thereby reaching an optimal memory allocation between a multitude of memory controllers and master devices.

The access requests from the masters 102a-102n are typically read requests to access data at specific memory addresses, write requests to write data to specific memory addresses, or control requests to control the memory management modules 110. In the case of a control request, each memory management module determines if the control request should be accepted. In one embodiment, the control request is a request to change the address space of the memory component that is assigned to a specific memory controller to a new address space, thereby enabling the specific memory controller to relinquish ownership of the memory component and assign the memory component to a different memory controller (as given, for example, by the new address space, which now falls within the controller address space of the different memory controller).

Figure 2:
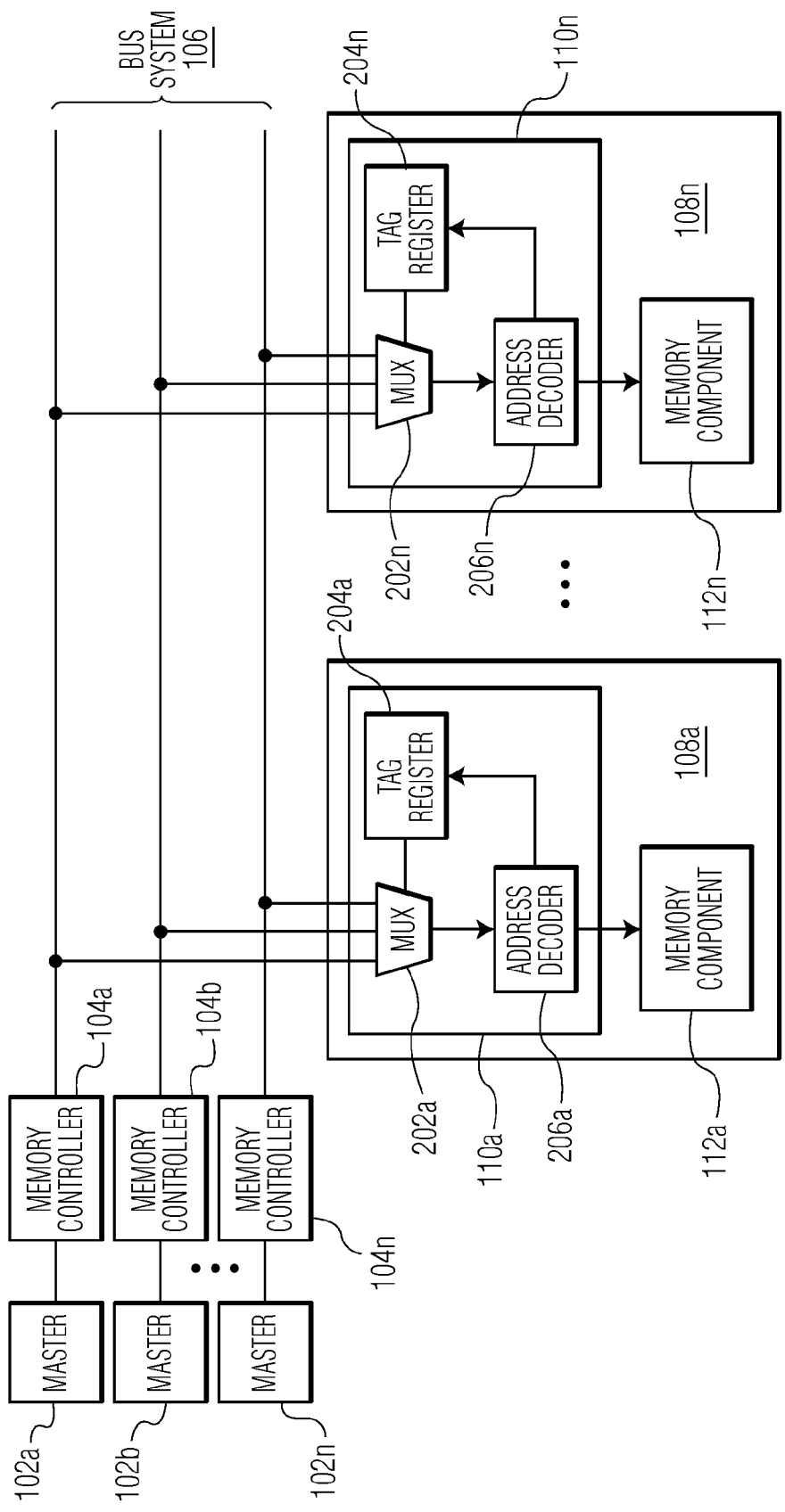
FIG. 2 depicts components of the system of FIG. 1 that are involved in the writing processes in accordance with an embodiment of the invention.

FIG. 2 depicts components of the system of FIG. 1 involved in the writing processes to the memory systems 108a-108n in accordance with an embodiment of the invention. In the embodiment of FIG. 2, the memory management modules 110a-110n each include a multiplexer (MUX) 202 coupled to a tag register 204. The multiplexer is a known device to select and output one of several input signals. The tag register is a storage device for storing information. The tag register may be part of the memory component (e.g., implemented on the same memory chip) or may be a separate device, such as a hardware register or other memory device. Typically, the tag register runs on the same clock domain as the memory component to which it is connected, and the clock signals to the tag register are similarly changed if the clock domain of the new memory controller that the tag register is assigned to is different from the previous clock domain. Each memory management module further includes an address decoder 206, which is configured to direct received data to the correct address location in the corresponding memory component.

In the embodiment of FIG. 2, for each of the memory systems 108a-108n, the MUX 202 accepts data streams from the memory controllers 104a-104n via the bus system 106 and the MUX outputs one or more of the data streams to the respective address decoder 206 based on a value stored in the respective tag register 204. The data streams typically include access requests as described above with reference to FIG. 1. If the access request is a write request, the data streams further include data to be written to the appropriate memory component.

In one embodiment, for each of the memory systems 108a-108n, the tag register 204 stores a first value representing the memory controller to which the respective memory component 112 is assigned (the memory controller thereby having ownership over the memory component). The tag register further stores a second value representing the address space that the memory component will appear as to the memory controller to which the memory component is assigned. In a non-limiting example, the tag register is 32 bits long, whereby the top 4 bits represent the memory controller that has ownership over the memory component (e.g., 0001 representing controller 1, 0010 representing controller 2, etc.) and the next 28 bits represent the address space that the memory component will appear as to the memory controller. In this embodiment, the MUX 202 only selects data streams that originate from the memory controller indicated by the respective tag register and the MUX then forwards the selected data streams to the respective address decoder. An address translation occurs if the address space presented to the memory controller is different to the physical address space of the memory component.

In another embodiment, for each of the memory systems 108a-108n, the tag register 204 stores a particular memory address space, and thereby assigns the respective memory component to that particular address space. The MUX 202 determines which, if any, of the incoming data streams contains a memory address that is within the particular address space given by the value stored in the respective tag register. The MUX is configured to output a data stream and forward the data stream to the respective address decoder 206 if the memory address of the data stream is located within the address space given by the value stored in the respective tag register.

Upon receiving the data stream, the address decoder 206 directs the data contained in the data streams to the memory address within the address space of the memory component 112. In one embodiment, the data stream is a request to write to a memory address and the data to be written to that memory address. In another embodiment, the data stream includes a control request to change the value stored in the tag register 204 and further includes a new value to be written to the tag register. In this embodiment, the memory address of the data stream is directed to the tag register and the respective address decoder writes the new value to the tag register, thereby changing which data streams the respective MUX will subsequently accept.

Taking as an example the memory system 108a and access requests from the master 102a and the master 102b, the MUX 202a receives the access requests over the bus system 106 and compares the memory addresses of the access requests with the value of the address space stored in the tag register 204a. In this example, the access requests are requests to write data to a memory address and each access request is contained in a data stream that also includes the data to be written to the memory address. In an exemplary embodiment, a first access request from the master 102a includes a first memory address that is located within the controller address space of the memory controller 104a and a second access request from the master 102b includes a second memory address that is located within the controller address space of the memory controller 104b. In this example, the first memory address of the access request from the master 102a is within the address space associated with the memory component 112a, whereas the second memory address of the access request from the master 102b is outside the address space associated with the memory component 112a.

The MUX 202a receives the first access request and determines whether the first access request should be accepted. The determination includes, in a non-limiting example, a comparison with a tag value indicating ownership of the memory component 112a or includes a comparison of the first memory address with the address space of the memory component 112a. As a consequence of determining that the access request should be accepted, the MUX grants the master 102a access to the memory component by forwarding the first access request to the address decoder 206a, which then accesses the first memory address, for example by writing data from the data stream that contained the first memory request to the first memory address of the memory component 112a.

The MUX 202a also receives the second access request and determines, for example, that the second memory address is outside the address space associated with the memory component 112a. As a result, the MUX does not select the data stream that contained the access request and the data stream from the master 102b is not forwarded to the address decoder.

Figure 3:
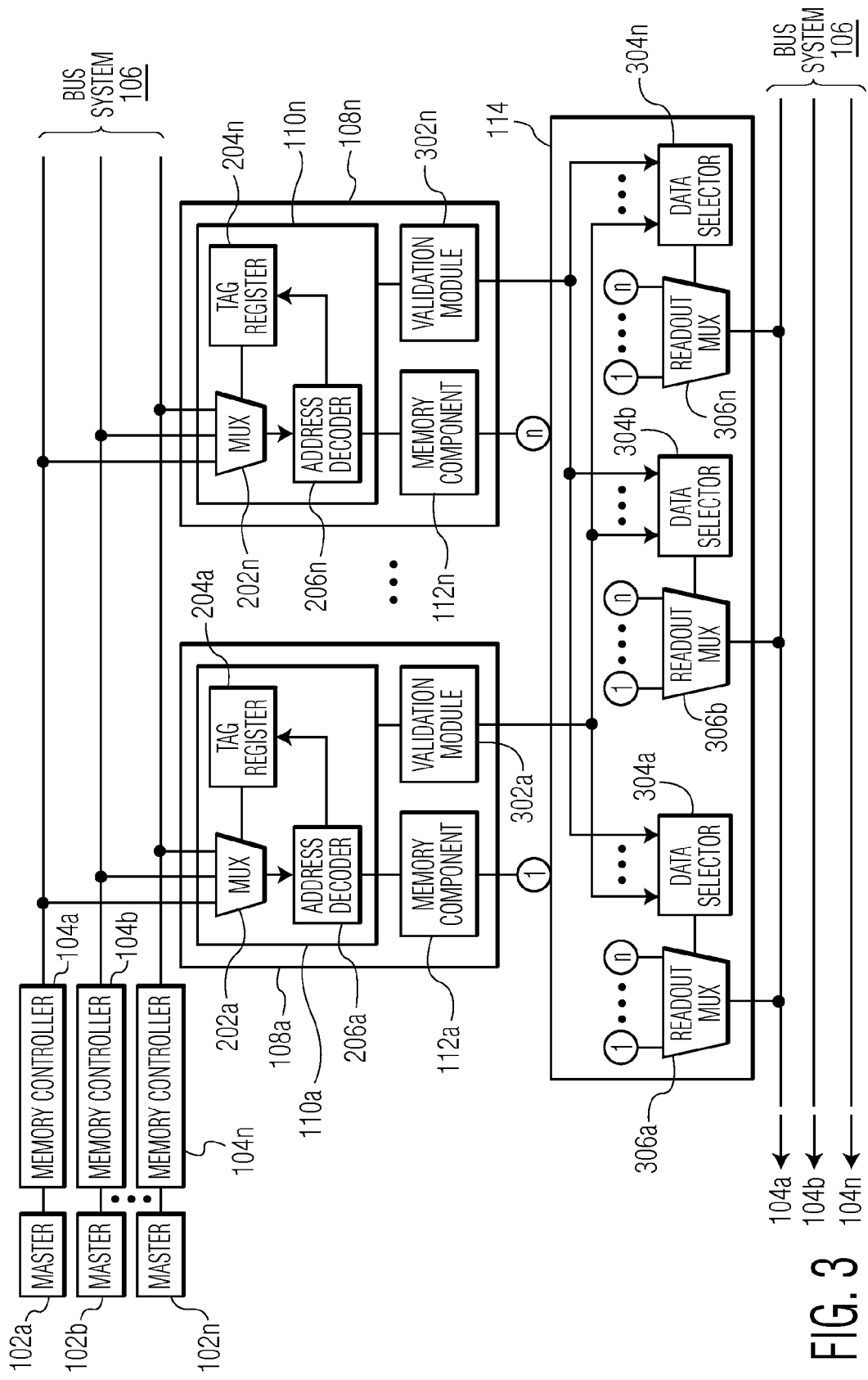
FIG. 3 depicts components of the system of FIG. 1 that are involved in the reading processes in accordance with an embodiment of the invention.

FIG. 3 depicts components of the system of FIG. 1 that are involved in the reading processes from the memory systems 108a-108n in accordance with an embodiment of the invention. In the embodiment of FIG. 3, the memory system 108 is similar to the memory system described above with reference to FIG. 2. FIG. 3 further depicts validation modules 302a-302n connected to respective memory management modules 110a-110n. The validation modules are configured to provide information about whether or not an access request is accepted by the respective MUXs 202a-202n. In one embodiment, each validation module is considered to be part of the respective memory management module 110. The readout circuitry 114 as depicted in FIG. 3 further includes readout MUXs 306a-306n and data selectors 304a-304n, which are connected to the memory systems 108a-108n. The data selectors are configured to receive information from the validation modules and based on that information to indicate to the readout MUXs which inputs (from the inputs 1 to n) to output to the bus system 106. Although two memory systems are depicted in FIG. 3, this number is purely exemplary and any number of memory systems may be used. Similarly, three pairs of readout MUXs and data selectors are depicted, but other combinations are possible. Typically, the number of readout MUXs and data selector pairs are equal to the number of memory controllers connected to the bus system 106, and each readout MUX and data selector pair may be part of a memory controller or may be implemented separately from the memory controllers.

The following is a description of an embodiment relating to read requests originating from a master connected via a memory controller and a bus system to the memory systems 108a-108n. In operation, the memory systems receive read requests from the memory controllers 104a-104n connected to the bus system 106. In the embodiment of FIG. 3, the read requests include the memory address from which data should be read. The MUX 202 of each memory system selects only the read requests that indicate a memory address that is within the address space derived from a value stored in the tag register 204. If the memory address of the read request is determined to be within the address space assigned to the memory component (thereby indicating that the memory controller that sent the read request has ownership over the memory component), then the read request is forwarded to the address decoder 206 and data is read out from the memory address of the memory component, as specified by the read request (as depicted by numerals 1-4 in FIG. 3).

In one embodiment, the validation modules 302a-302n indicate whether or not an address match has occurred in the memory system, i.e., whether or not the multiplexors 302a-302n have selected and forwarded a read request. The data selectors 304a-304n are coupled to the readout MUX 306a-

306n, respectively, and each data selector receives signals from all validation modules. Based on the signals from the validation modules, the readout MUX 306a-306n are configured to select the read data (one or more of inputs 1 to n) from the memory system 108 where an address match occurred and outputs the read data to the corresponding memory controller 104 if that memory controller is the destination of the readout data.

Figure 4A:
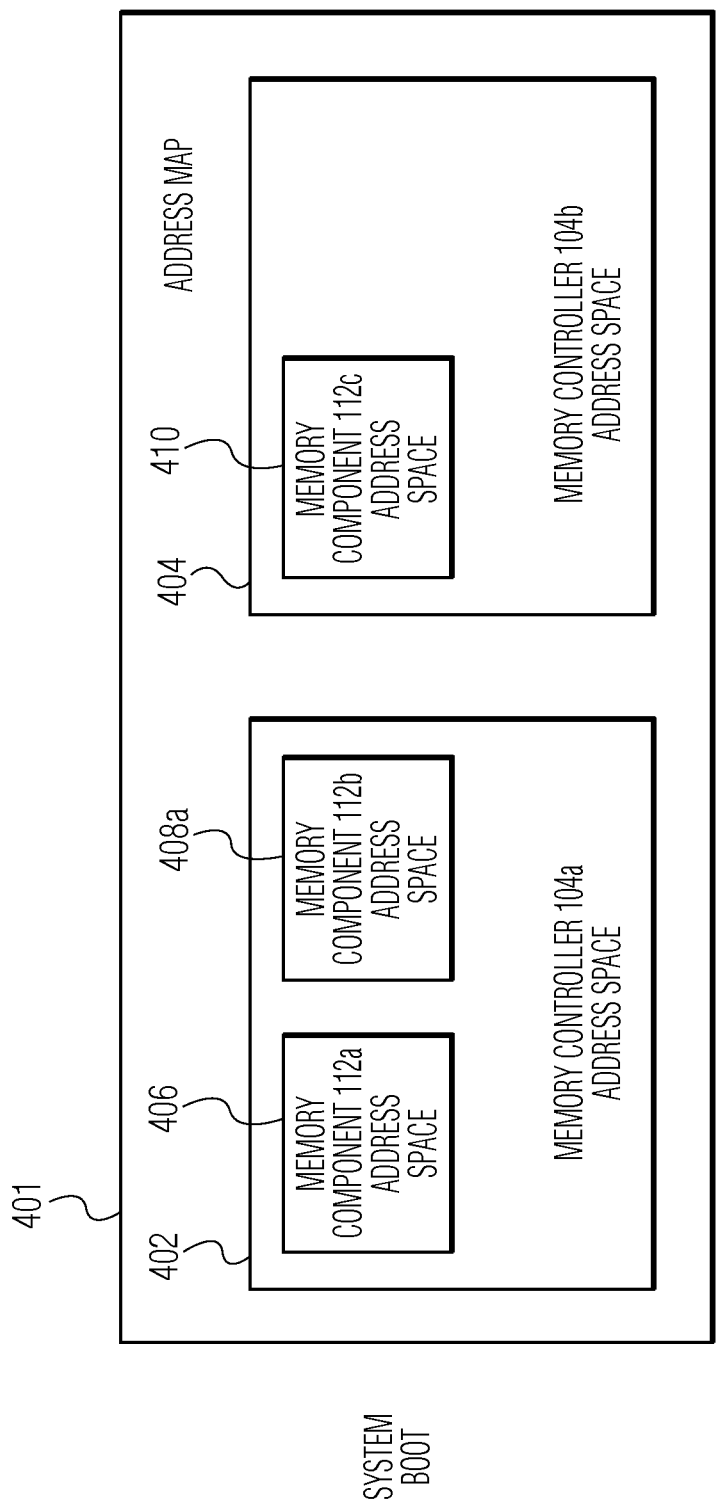
FIGS. 4A-4D depict locations of memory and controller address spaces within an address map in accordance with an embodiment of the invention.

FIGS. 4A-4D illustrate how the address spaces of the memory components 112a-112n are mapped with respect to the addresses spaces of the memory controllers 104a-104n to allocate memory resources. Specifically, FIGS. 4A-4D depict locations of address spaces 406, 408 and 410 of the memory components 112a-112c, respectively, and address spaces 402 and 404 of the memory controllers 104a and 104b within an address map 401. FIG. 4A depicts mapping of memory components 112a, 112b and 112c to memory controllers 104a and 104b at system boot. In the embodiment of FIG. 4A, memory components 112a and 112b are mapped to memory controller 104a by assigning the address space 406 of the memory component 112a and the address space 408a of the memory component 112b within the address space 402 of the memory controller 104a. The memory component 112c is mapped to memory controller 104b, whereby the address space 410 of the memory component 112c is within the address space 404 of the memory controller 104b.

Figure 4B:
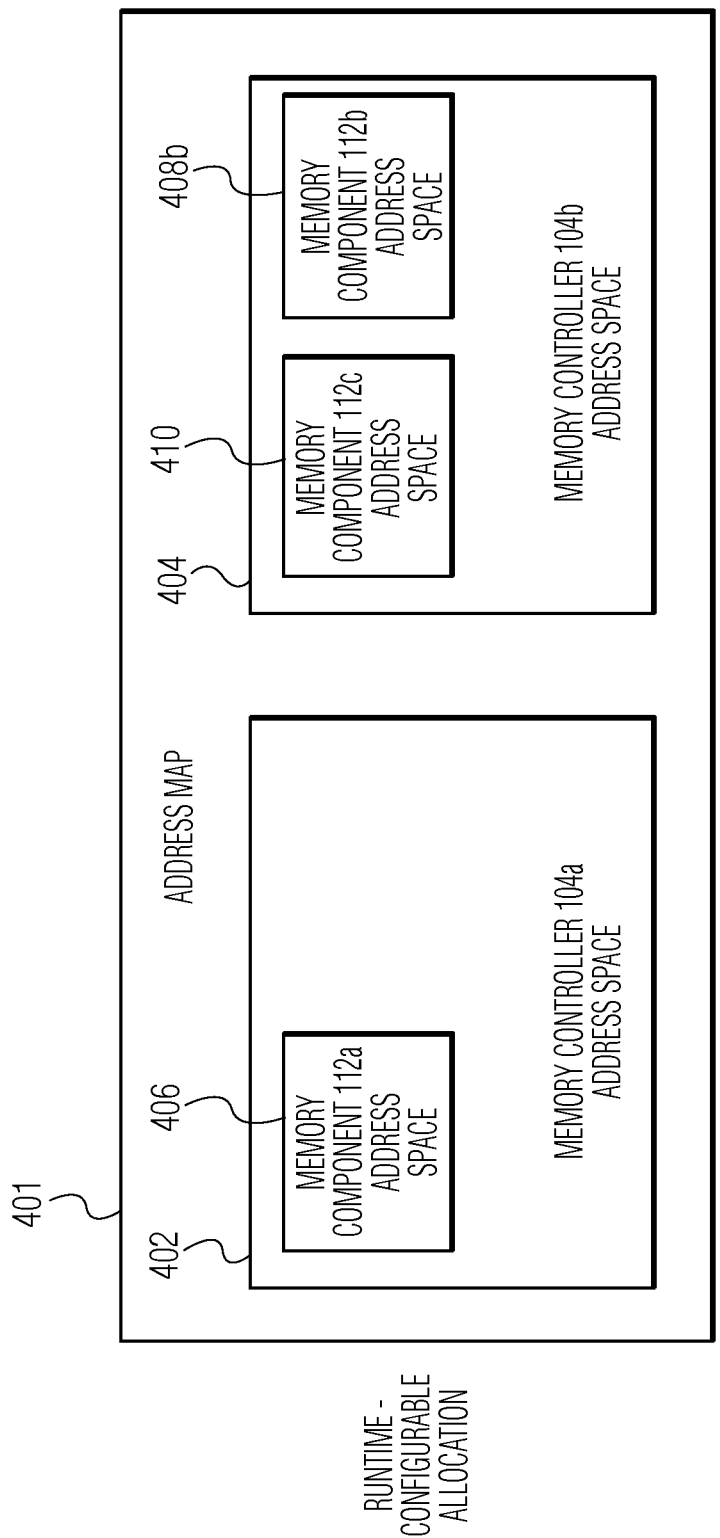

FIG. 4B depicts a reconfiguration of the address mapping of the memory components during runtime. In the embodiment of FIG. 4B, the memory component 112b is now assigned to an address space 408b (changed from the previously assigned address space 408a depicted in FIG. 4A), and the address space 408b is within the boundaries of the address space 404 of the memory controller 104b, thereby giving ownership of the memory component 112b to the memory controller 104b. As described above with reference to FIGS. 1-3, changing the address space of the memory component 112b may be done, for example, by changing a tag value in the tag register 204a of the memory system 108a. In one embodiment, overlapping of memory address spaces is prohibited such that no two memories may share memory addresses. Overlapping may be protected against, for example, in software.

Figure 4C:
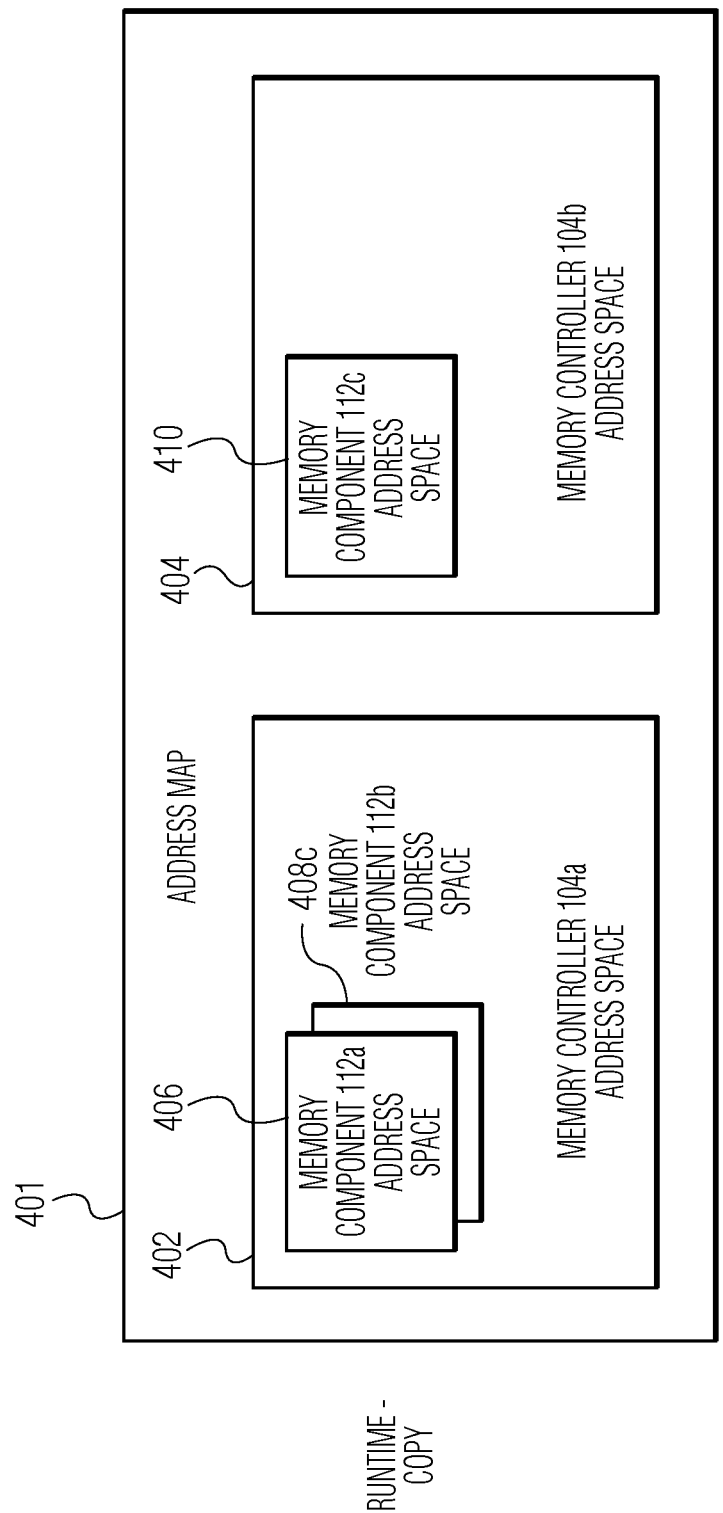

FIG. 4C depicts an embodiment where the overlapping is allowed. In the embodiment of FIG. 4C, the memory component 112b is assigned an address space 408c. The address space 408c of the memory component 112b is made to coincide with the address space 406 of the memory component 112a. In this embodiment, a copy of data written to the memory component 112a will also be stored in the memory component 112b. Writing to the address space shared by the memory components 112a and 112b will occur, for example, in parallel to both memory components. In one embodiment, a read request with a memory address within the shared address space is fulfilled from the first of the memory components 112a and 112b with overlapping address spaces.

Figure 4D:
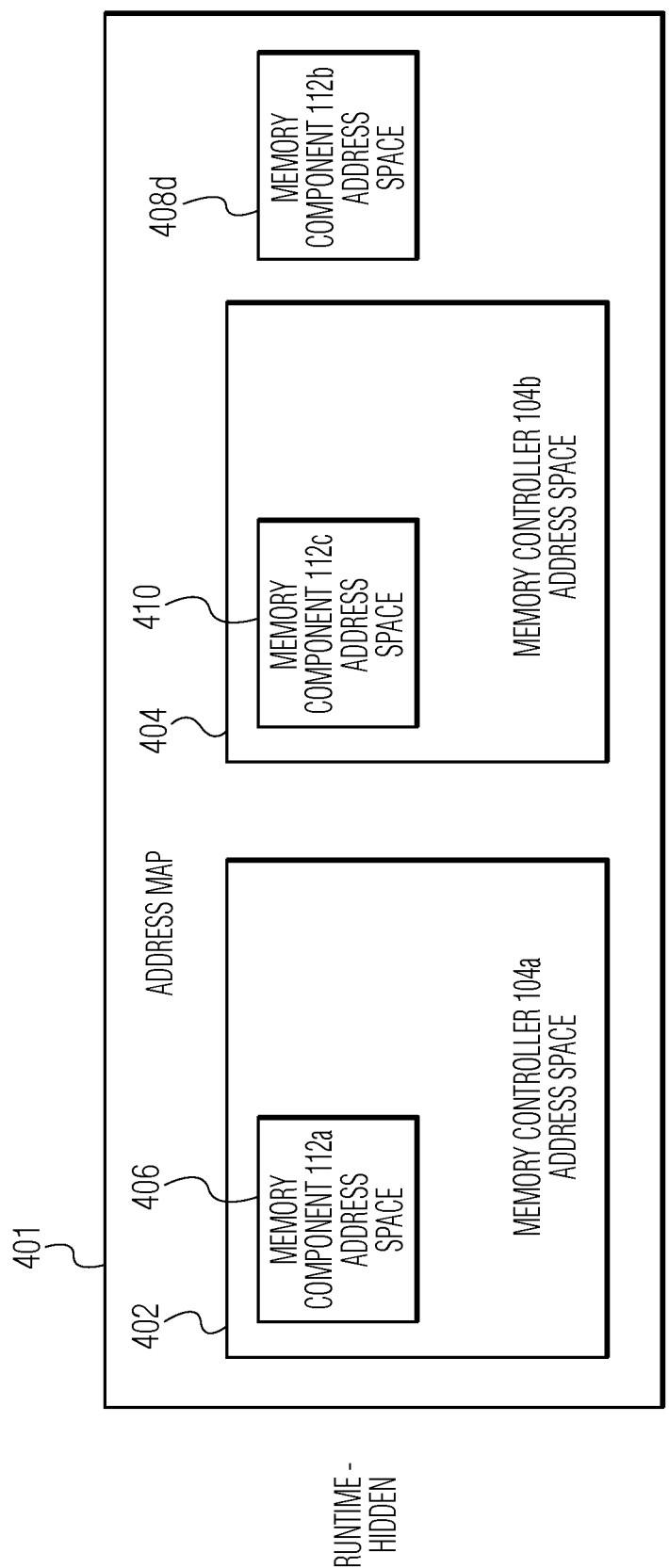

FIG. 4D depicts an embodiment where the memory component 112b (and any data stored in the memory component) is hidden from all memory controllers. In this embodiment, the address space 408d assigned to the memory component 112b is placed outside the address spaces of memory controllers 104a and 104b.

FIG. 5 depicts a flow diagram of a method for allocating memory resources in accordance with an embodiment of the invention. At block 502, an access request is received at a memory system from a first requestor of a plurality of requestors. Next, at block 504, a value stored in the memory system, indicates whether the first requestor has access rights to a memory component of the memory system. Next, at block 506, the first requestor is granted access to the memory component if the value indicates that the first requestor has access rights to the memory component, wherein the value is configurable to change the access rights to the memory component to a second requestor of the plurality of requestors.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A system for allocating memory resources comprising:
a bus system coupled to a plurality of requestors; and
a plurality of memory systems coupled to the bus system, each memory system including:
a memory component, and
a memory management module including a value that represents access rights to the memory component, wherein the memory management module is configured to receive an access request from a first requestor of the plurality of requestors and to grant access to the memory component only if the value indicates that the first requestor has access rights to the memory component, further wherein the memory management module is configurable to change the value to give the access rights to the memory component to a second requestor of the plurality of requestors wherein the memory management module includes a tag register for storing the value, and a multiplexer coupled to the tag register and to the memory component, the multiplexer being configured to receive the access request and to determine whether or not to grant access to the memory component by the first requestor based on the value.

2. The memory system of claim 1, wherein the value represents the first requestor and only access requests from the first requestor are granted by the memory management module.

3. The memory system of claim 1, wherein the tag register includes an address space assigned to the memory component, the one of the plurality of requestors being granted access to the memory component only if a memory address of the access request falls within the address space assigned to the memory component, wherein the tag register is configurable to assign a different address space to the memory component.

4. The memory system of claim 1, wherein the first requestor has ownership of the memory component if the value indicates that the first requestor has access rights to the memory component.

5. The memory system of claim 4, wherein the tag register is configurable only by a requestor of the plurality of requestors that has ownership over the memory component.

6. The memory system of claim 1, wherein the first requestor is able to change the value of the tag register and relinquish ownership of the memory component, thereby assigning the memory component to another requestor of the plurality of requestors.

7. The memory system of claim 1, wherein the first requestor is a memory controller.

8. The memory system of claim 7, wherein the access request originates from a master coupled to the memory system via the memory controller.

9. The memory system of claim 1 further comprising an address decoder, wherein the address decoder is configured to point data associated with the access request to a memory address given by the access request if the requestor is granted access to the memory component.

10. The memory system of claim 1, wherein the access request includes a write request and associated data to be written to a memory address of the memory component.

11. The memory system of claim 1, wherein the access request includes a read request for data to be read from a memory address included in the access request.

12. The memory system of claim 1, wherein the access request includes a request to change the value of the tag register.

13. The memory system of claim 1, wherein the memory component is at least part of: a random access memory, a register, a flash memory, and a read only memory.

14. A system for allocating memory resources comprising:
a bus system coupled to a plurality of requestors;
a plurality of memory systems coupled to the bus system, each memory system including:
a memory component, and
a memory management module including a value that represents access rights to the memory component, wherein the memory management module is configured to receive an access request from a first requestor of the plurality of requestors and to grant access to the memory component only if the value indicates that the first requestor has access rights to the memory component, further wherein the memory management module is configurable to change the value to give the access rights to the memory component to a second requestor of the plurality of requestors, wherein the memory management module includes a tag register for storing the value, and a multiplexer coupled to the tag register and to the memory component, the multiplexer being configured to receive an access request and to determine whether or not to grant access to the memory component by the one of the plurality of requestors based on the value; and
a readout circuitry coupled to the memory systems and the bus system, the readout circuitry being configured to selectively transmit data from the memory systems to the bus system based on access requests to the memory components.

15. A memory system for allocating memory resources comprising:
a bus system coupled to a plurality of memory controllers; and
a plurality of memory systems coupled to the bus system, each memory system including:
a memory component, and
a memory management module including a value that represents
access rights to the memory component, wherein the memory
management module is configured to receive an access request from a first memory controller of the plurality of memory controllers and to grant access to the memory component only if the value indicates that the first memory controller has access rights to the memory component, wherein the memory management module is configurable to change the value to give the access rights to the memory component to a second memory controller of the plurality of memory controllers and wherein when the memory component is assigned from the first memory controller to the second memory controller, a first clock signal from the first memory controller to the memory component is shut off and a second clock signal from the second memory controller is passed to the memory component.

16. The memory system of claim 15 wherein each memory controller is electrically coupled to one or more bus masters and receives clock signals from a specific clock domain of the bus masters.

17. The memory system of claim 15 further comprising an address decoder, wherein the address decoder is configured to point data associated with the access request to a memory address given by the access request if the memory controller is granted access to the memory component.

18. The memory system of claim 15, wherein an additional memory component is assigned to the first memory controller.

19. The memory system of claim 15, wherein the memory component is hidden from the plurality of memory controllers.

20. The memory system of claim 19, wherein an address space of the memory component overlaps with an address space of the another memory component.

* * * * *